Dec. 27, 1966  S. R. TYLER  3,293,856
AIRCRAFT GAS TURBINE ENGINE CONTROL SYSTEM
Filed May 18, 1964  10 Sheets-Sheet 4

INVENTOR
STANLEY R. TYLER

BY
Reynolds + Christensen
ATTORNEYS

Dec. 27, 1966 S. R. TYLER 3,293,856
AIRCRAFT GAS TURBINE ENGINE CONTROL SYSTEM
Filed May 18, 1964 10 Sheets-Sheet 5

FIG. 5.

INVENTOR
STANLEY R. TYLER

BY Reynolds & Christensen
ATTORNEYS

Dec. 27, 1966  S. R. TYLER  3,293,856
AIRCRAFT GAS TURBINE ENGINE CONTROL SYSTEM
Filed May 18, 1964  10 Sheets-Sheet 8

INVENTOR
STANLEY R. TYLER
BY Reynolds & Christensen
ATTORNEYS

Fig. 9.

INVENTOR
STANLEY R. TYLER
BY Reynolds & Christensen
ATTORNEYS

FIG. 10.

United States Patent Office 3,293,856
Patented Dec. 27, 1966

3,293,856
AIRCRAFT GAS TURBINE ENGINE
CONTROL SYSTEM
Stanley R. Tyler, Cheltenham, England, assignor to Dowty Fuel Systems Limited, Cheltenham, England, a British company
Filed May 18, 1964, Ser. No. 368,167
Claims priority, application Great Britain, May 24, 1963, 20,767/63
8 Claims. (Cl. 60—237)

This invention relates to a control system for an aircraft gas turbine engine having reheat burners and an adjustable area jet nozzle.

The object of this invention is to provide a control system for the adjustable nozzle and the reheat burners by which the thrust developed at the nozzle may be easily adjusted by the aircraft pilot.

In accordance with the present invention a control system for an aicraft gas turbine engine having reheat burners and an adjustable area jet nozzle includes a latch capable of locking the jet nozzle against enlargement and means responsive to light-up of reheat burners to unlatch the adjustable jet nozzle to permit jet nozzle enlargement.

The means responsive to the light-up of reheat burners may comprise apparatus responsive to change in the ratio of pressures at the inlet and exhaust of the turbine of the gas turbine engine.

Where the nozzle adjustment is effected through the medium of a servo motor the latch may operate on a servo motor control to lock the nozzle against enlargement.

Where control of the thrust from the gas turbine engine under reheat conditions is effected by arranging that the aircraft pilot's control acts directly on the area of the jet nozzle and reheat fuel flow is automatically adjusted to maintain the ratio between the turbine inlet and exhaust pressures at a constant value, the present invention further provides for means to initiate light-up of reheat burners by movement of the pilot's reheat thrust control in the attempt to increase jet nozzle area against the latch. When light-up takes place the jet nozzle area adjustment is unlatched and movement of the pilot's control may directly increase nozzle area. The pilot's control may include a spring-loaded lost motion device in which the spring loading is normally strong enough to prevent lost motion when the jet nozzle is unlatched, but when the jet nozzle is latched the attempt to move the pilot's control can only cause movement thereof within the lost motion against spring loading, such movement being adapted to initiate flow of reheat fuel and light-up of the reheat burners.

There may be a number of sets of reheat burners adapted to be brought successively into operation to provide increased engine thrust and in this case the nozzle latch may be arranged to latch the nozzles successively at different areas as it becomes necessary to light-up the successive sets of reheat burners. One embodiment of the present invention will now be described with reference to the accompanying diagrammatic drawings in which:

Figure 1:
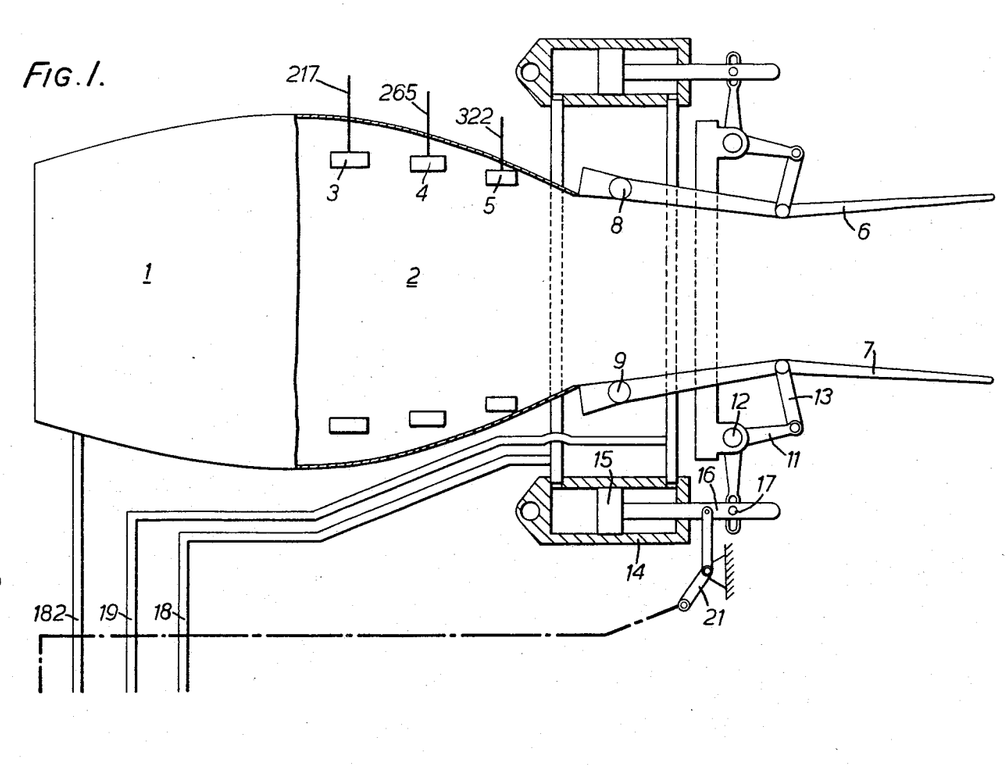
FIGURE 1 is a diagrammatic illustration of gas turbine engine controlled by the present system.

The gas turbine engine with which the control is intended to operate is indicated diagrammatically at 1. This engine may be of any well known type but for convenience and simplicity of description it is assumed that this engine is of the simplest type comprising a compressor and a turbine mounted on the same shaft and combustion chambers located between the compressor and the turbine. The invention is equally applicable to more complicated engines, such for example as a two-spool engine. In order to obtain reheat there is provided in the jet nozzle 2 three sets of burner galleries indicated diagrammatically at 3, 4 and 5. Fuel may be sprayed into the jet nozzle from these burner galleries to heat the turbine exhaust and so to increase the thrust from the engine. In order that the engine may continue to operate normally under reheat conditions the jet nozzle is adjustable in its area by the provision of a pair of vanes 6 and 7 secured at pivots 8 and 9 on the engine structure and arranged so that the space in between them may be adjusted. The adjustment means for each vane comprises a bell crank lever 11 pivoted at fulcrum 12 on the engine structure, a link 13 pivotally connected from one end of the bell crank lever to the vane, a servo cylinder 14 secured to the engine structure, a servo piston 15 in the cylinder from which a piston rod 16 extends a pin and slot connection 17 to the other end of the bell crank lever 11. These adjustment mechanisms for all vanes are secured together so that they must move in unison. A pair of hydraulic connections 18 and 19 extend one to either end of the servo cylinder 14 to effect adjusting movement of the vanes. All of the cylinders 14 are connected hydraulically in parallel with one another. Connected to the piston rod 16 is a lever 21 which provides a feedback connection which signals movement of the vanes to differing parts of the control system.

For controlling the supply of hydraulic fluid to the servo cylinders 14 a hydraulic pump 22 (FIG. 7) is provided which includes a parallel connected bypass valve 23. The pump 22 is engine driven and the bypass valve 23 serves to ensure that hydraulic liquid at constant pressure is available to operate the servo cylinders 14. The delivery from pump 22 passes to a pipe 24 which enters a servo valve assembly 25. The valve assembly 25 comprises a fixed cylinder 26 within which a spool valve 27 having spaced lands 28, 29 and 31 is provided. Spool valve 27 controls five ports 32, 33, 34, 35 and 36 in the wall of the cylinder 26. The delivery passage 24 from pump 22 enters the port 34 and flow of liquid is controlled by the land 29. Pipes 18 and 19 connect respectively to the ports 33 and 35. The ports 32 and 36 are connected in parallel to a pipe 37 to carry liquid at low pressure back to the pump 22. Springs 38 located one at either end of the spool valve 27 help to urge the spool valve into its central position. The position of the spool valve 27 is adjusted by the hydraulic pressure existing at the two ends of the cylinder 26 such hydraulic pressure difference being fed to the two ends of the cylinder by pipes 39 and 41.

Figure 6:
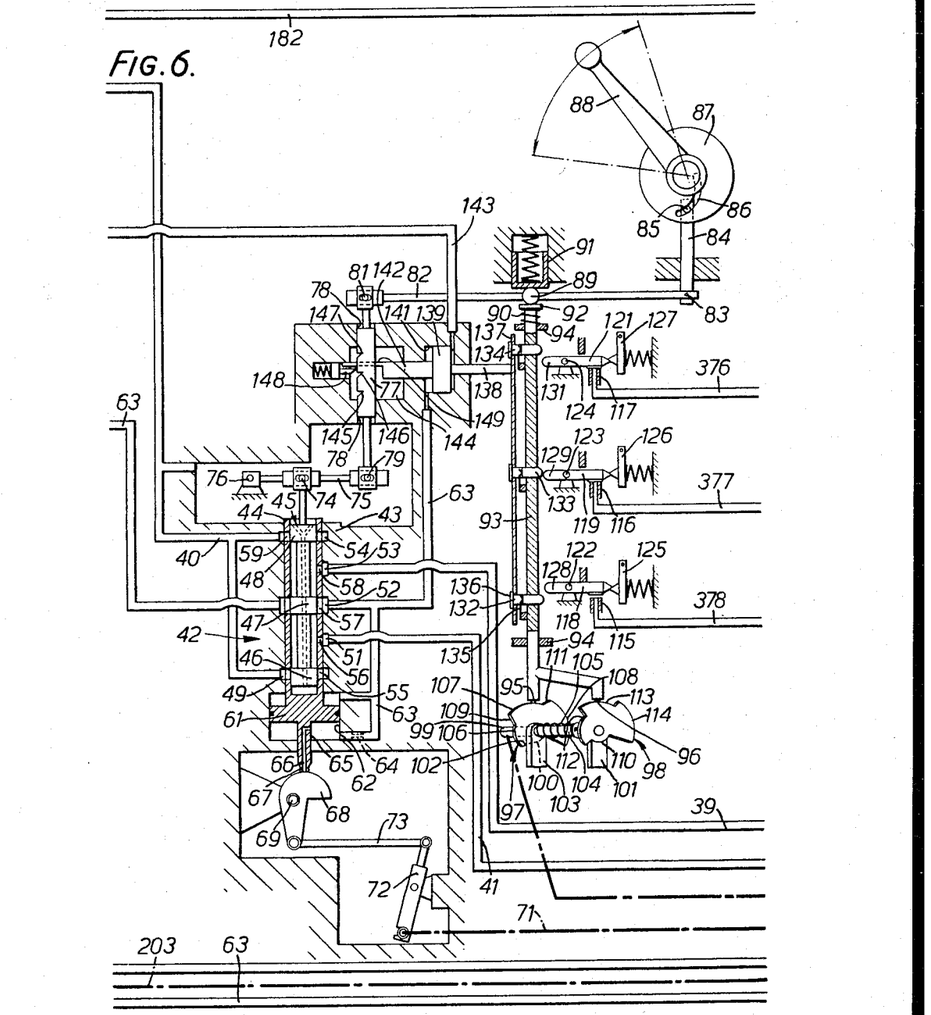
FIGURE 6 is a detailed illustration of control valves and including the pilot's selection lever associated therewith.

The pipes 39 and 41 extend from a control valve 42 (FIG. 6). This valve comprises a cylinder 43, a sleeve 44 slidable within the cylinder 43 and a spool valve 45 slidable within the sleeve 44. The spool valve 45 includes three spaced lands 46, 47 and 48. Within the wall of the cylinder 43 are located five spaced ports 49, 51, 52, 53 and 54. Cooperating respectively with these ports are ports 55, 56, 57, 58 and 59 in the sleeve. Within the range of movement of the sleeve 44 the ports in the sleeve make connection only with their respective ports in the cylinder 43. This fact might not appear from the drawing which has been drawn with incorrect proportions to reduce its total size. The sleeve 44 is adjustable in an endwise sense by means of an integrally formed servo piston 61. This piston is mounted within a servo cylinder 62 operated on the servo vent principle. For this purpose the end of the cylinder 62 adjacent to the sleeve 64 is fed from pipe 63 with liquid at the pressure delivered from the delivery passage 24 of the pump 22. The end of the cylinder 62 remote from the sleeve 44 is fed from the pipe 63 through a restrictor 64. A small diameter extension 65 extends in sealed manner to the end of the cylinder 62 remote from the sleeve 44 and through this projection a vent passage 66 is provided. The end 67 of projection 65 cooperates with a cam 68. If the end 67 of projection 65 is spaced from the surface of the cam 68 there will be leakage through the passage 66 which will reduce the pressure below the piston 61 as seen in the drawing so that the higher pressure above the piston 61 will urge it downwardly towards the cam 68 until the end 67 is nearly in contact with the surface of cam 68. At such position the leakage through the passage 66 will be reduced and movement of piston 61 will stop when leakage through the passage 66 is such that the lower pressure below the piston is in force balance with the higher pressure above the piston by virtue of their differing effective areas.

The cam 68 is rotated by movement of a feed-back link 71 extending from the feedback lever 21 (FIG. 1) on the jet nozzle. Movement of the link 71 passes through a reversing lever 72 (FIG. 6) and the link 73 to the cam 68.

The spool valve 45 (FIG. 6) of valve 42 is pivotally connected at 74 to a lever 75 having a fixed fulcrum 76. A plunger 77 carried by guides 78 is connected by a pivot 79 to the lever 75. The plunger 77 in turn is connected by a pivotal connection 81 to a floating lever 82. The end of the lever 82 opposite to the pivotal connection 81 is secured by a pivotal connection 83 to a link 84 which terminates in a pin 85 engaging a cam slot 86 of a rotary plate 87. The plate 87 is pivoted at a fixed position and is rotatably adjustable by means of the pilot's selection lever 88. This selection lever is used by the pilot to adjust the amount of extra thrust obtained by reheat. The central fulcrum 89 of lever 82 is urged downwardly as shown in the drawing by means of a spring loaded plunger 91 against the end plate 92 carried by a plunger 93. The plunger 93 is slidably mounted in guides 94. The plunger 93 is formed with a pair of cam followers 95 and 96 which engage respectively with cams 97 and 98. The cam 97 is fixedly secured to a shaft 99 mounted in a bearings 101 and 103 whilst the cam 98 is connected to a shaft 99 through the medium of a pin and slot lost motion connection 104 and a torsion spring 105. The shaft 99 is connected by means of a rotary joint (not shown) to the link 71, the arrangement being such that rotation of the shaft 99 is in proportion to the feedback movement of the feedback lever 21. The cam 97 is provided with four constant dwell portions at differing radii indicated at 100, 106, 107 and 108, the constant dwell portions being interconnected by ramps 102, 109 and 111 so that rotation of the cam as seen in the drawing will cause the follower 95 to be urged upwardly. The cam 98 is provided also with four dwell portions 110, 112, 113, 114 whose radii are equal to the dwell portions respectively 100, 106, 107 and 108 of cam 97. In the case of cam 98 the dwell portions are interconnected by steps which extend radially.

Initiation of fuel flow to the galleries 3, 4 and 5 is controlled respectively by three servo vents 115, 116 and 117 (FIG. 6). These vents have closure members indicated respectively at 118, 119 and 121 which have fixed pivots 122, 123 and 124 respectively. With each of the closure members a spring loaded latch respectively 125, 126 and 127 cooperates, the function of the latch in each case being to maintain the closure member either in a fully closed or a fully open position having regard to the servo vent. The closure members each include a nose indicated respectively at 128, 129 and 131, arranged in line for cooperation respectively with three transverse plungers 132, 133, and 134 slidably carried for transverse movement within the plunger 93. The spacing between the plungers 132, 133 and 134 is slightly greater than the spacing between the noses 128, 129 and 131 so that within a short axial movement of the plunger 93 the plungers 132, 133 and 134 will successively make contact with the noses 128, 129 and 131. The plungers 132, 133 and 134 each include a spring 135 extending from the plunger 93 acting on a flat surface to urge the plunger to the right as seen in the drawing. Each of the plungers 132, 133 and 134 includes a head 136 which engage on a bar 137 located adjacent to the plunger 93 in parallel relation therewith. The bar 137 is carried by a piston rod 138 extending from a servo piston 139. Servo piston 139 is carried within a servo cylinder 141 and is capable under the action of hydraulic pressure of a small movement only to move the bar 137 transversely to withdraw the three plungers 132, 133 and 134 simultaneously to disengage from any of the three noses 128, 129 and 131. The cylinder 141 is supplied at the left hand end as seen in the drawing with pressure from the pipe 63. The effective area of piston 139 at the left hand end is reduced by virtue of a piston rod 142 extending to the left hand end of cylinder 141. The right hand end of cylinder 141 is supplied with hydraulic pressure through a pipe 143. The effective area at the right hand end of the piston 139 is greater than the area at the left hand end by virtue of the comparatively small diameter of plunger 138 extending through the end of the cylinder 141 so that if pressure in the pipe 143 is made equal to the pressure in the pipe 63 piston 139 will move to the left as seen in the drawing.

The plunger 77 (FIG. 6) extends through a chamber 144 between the supports 78 and the plunger 142 extends into this chamber for movement in a direction transverse to that of the plunger 77. The plunger 77 includes three spaced notches 145, 146 and 147 whose upper portions extend perpendicularly to the direction of movement of the plunger 77 and whose lower portions are inclined to the direction of movement of plunger 77. A spring loaded pawl 148 is spring loaded against the plunger 77 in a direction at right angles to its direction of movement and is capable of engaging within any of the recesses 145, 146 and 147. The upper edge of the pawl 148 as seen in the drawing extends at right angles to the direction of the movement of the plunger 77 whilst the lower edge is inclined. The arrangement is such that if pawl 148 enters one of the notches 145, 146 and 147 it will resist movement of the plunger 77 in a downward direction as seen in the drawing but will permit upward movement thereof. An extension 149 on the piston rod 142 is arranged to engage pawl 148 when piston 139 is urged to the left as seen in the drawing to cause the pawl to withdraw from any of the notches 145, 146 or 147 in which it may be engaged.

The computing unit 151 (FIG. 5) is the means which responds to the ratio of the pressures at the inlet and the exhaust of the turbine of the gas turbine engine. In the unit 151 a chamber 152 is provided in which two pairs of bellows are located. One pair of bellows 153 and 154 are secured to opposite walls of the chamber 152 and at their free ends are joined by a rod 155. A lever 156 is mounted within the chamber at a fixed pivot 157, this lever extending in between the bellows 153 and 154 and being connected by a pin 158 to the rod 155. The bellows 153 is evacuated and the bellows 154 is connected by a passage 159 to a small chamber 161. The bellows 153 and 154 are of exactly similar cross-sectional area with the result that the force exerted at a pin 158 is exactly proportional to the pressure fed to the bellows 154.

Figure 5:
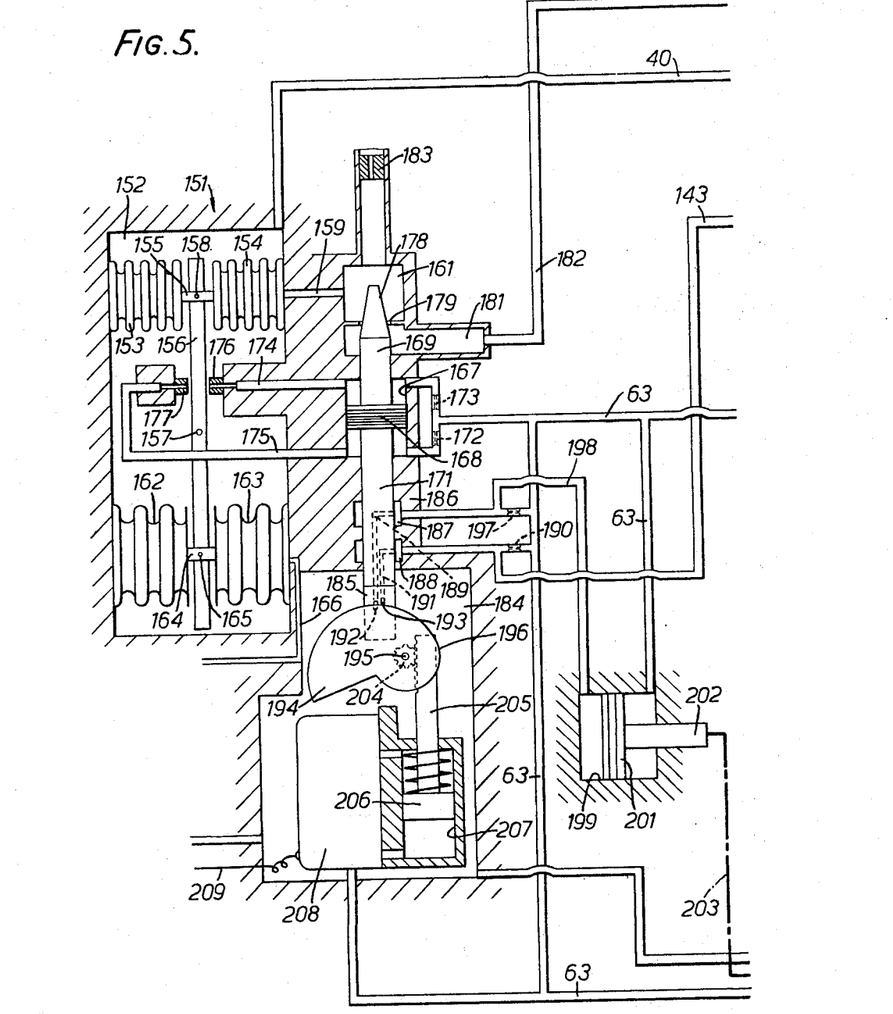
FIGURE 5 is a detailed illustration of the computing unit responding to ratio pressures at the inlet and exhaust of the gas turbine engine.

Adjacent to the opposite end of the lever 156 the second pair of bellows 162 and 163 are secured to opposite walls of the chamber 152, the free ends of these bellows being joined by a rod 164 having a pivotal connection 165 to the lever 156. The bellows 162 is evacuated and the bellows 163 is connected through a pipe 166 to the exhaust pressure of the turbine of the gas turbine engine. The bellows 162 and 163 are of equal cross-sectional areas so that at the pivot pin 165 a force is exerted on the lever 156 exactly proportional to turbine exhaust pressure. The forces exerted at the pivot pins 158 and 165 are in the opposite sense.

A servo cylinder 167 (FIG. 5) by the side of the chamber 152 includes slidably mounted therein a servo piston 168. Piston rods 169 and 171 extend from the piston 168 in opposite directions through the ends of the cylinder 167, suitable seals being provided to prevent leakage from the ends of the cylinder. Liquid at pressure delivered through pipe 63 from the pump 22 is fed to either end of the cylinder 167 through two restrictors 172 and 173. From the two ends of the cylinder 167 passages 174 and 175 extend to a pair of opposed servo vents 176 and 177 located on opposite sides of the lever 156. The relative leakages from the vents 176 and 177 will determine pressure drops occurring at the restrictors 172 and 173 and will thus determine the pressures existing at either end of the cylinder 167. At one position only of the lever 156 will the pressures at the two ends of the cylinder 167 be equal and movement of lever 156 in either direction from this particular position will cause movement of the piston 168 in one direction or the other. The end 178 of the piston rod 179 is tapered and enters the chamber 161 through an orifice 179. A passage 181 leads to the orifice 179. A pipe 182 carries air from the delivery of the engine compressor into the passage 181. Such air having passed the orifice 179 enters the chamber 161 from which it can flow to a low pressure zone such, for example, as the engine nacelle through a restrictor 183. The restrictor 183 is so designed that under all conditions of engine operation it operates in the choked condition i.e. the non dimensional flow rate through it is constant irrespective of the pressure exiting in the chamber 161. The area of the orifice 179 is adjusted by axial movement of the piston rod 169. At any position of the piston rod 169 it can be said that the pressure in the chamber 161 is a constant fraction of the compressor delivery pressure irrespective of variation of such pressure. Movement of the piston rod 169 will vary the fraction of compressor delivery pressure existing in the chamber 161.

The piston rod 171 enters into a chamber 184 and the portion thereof within the chamber 184 is provided with a flattened surface 185 extending parallel to the axis of the piston rod 171. Within the supporting structure 186 between cylinder 167 and chamber 184 a pair of ports 187 and 188 are provided around the piston rod 171 which cooperate with passages 189 and 191 within the piston rod 171. These passages terminate as vents 192 and 193 into the flat surface 185. Adjacent to the flat surface 185 a cam 194 is rotatably mounted on a spindle 195. The cam 194 has a flat side which moves closely adjacent to the flat surface 185 and the axis of rotation is set perpendicularly to the flat surface 185 so that the spacing between the cam and the flat surface 185 remains constant.

The vent 192 cooperates with the curved profile 196 of the cam 194 in that the vent will either be open, or partially open, or substantially closed, depending upon the relative positions of the rod 171 and the profile 196. The vent 192 is fed with liquid at pressure from the pipe 63 through a restrictor 197 and a passage 198. The passage 198 extends to one end of a servo cylinder 199 containing a servo piston 201. The opposite end of the cylinder 199 receives liquid at pressure from the pipe 63. A piston rod 202 extends in a sealed manner through the end of cylinder 199 which receives liquid at pressure from pipe 63, thereby creating a difference of effective areas on the two sides of the piston 201. The piston 201 will, therefore, move in accordance with the degree of closure of the cam profile 196 over the vent 192. The piston rod 202 is connected to a rod 203 extending for the control of fuel flow to the reheat galleries 3, 4 and 5.

The cam 194 (FIG. 5) is rotatable by means of a pinion 204 secured to its shaft 195 and a rack 205 engaging the pinion. The rack extends to a servo piston 206 slidably mounted in a servo cylinder 207. The hydraulic pressures fed to either end of the cylinder 207 to control movement of the piston 206 are determined by an electrohydraulic servo valve 208 of conventional construction, this valve being connected through an electrical conductor 209 to an electrical temperature sensing device at the inlet of the engine compressor. This temperature responsive device is capable only of slow operation.

For the supply of reheat fuel to the burner gallery 3, 4 and 5 a centrifugal pump 511 (FIG. 3) is provided. This pump operates on the principle disclosed in Patent No. 3,128,822. Within the pump casing 512 a shrouded impeller 513 is provided driven by a drive shaft 514 extending though a suitable bearing in the housing 51'. The drive shaft 514 extends from the gas turbine engine. The casing 512 is provided with a conventional volute which terminates in a delivery passage 215. Fuel enters into the centre of the pump impeller 513 through a plurality of radially directed apertures 516 formed in a cylindrical sleeve 517. Fuel enters the cylindrical sleeve at boost pressure through a passage 518. The end of the sleeve 517 remote from the pump is closed by a wall 519 through which a piston rod 521 extends in sealed relation. On the opposite side of the wall 519 a servo cylinder 522 is located within which a servo piston 523 is slidably mounted, the piston rod 521 extending from the piston 523. Within the sleeve 517 the piston rod 521 supports a slidable sleeve 524 which fits closely within the inner diameter of the sleeve 517. Endwise adjusting movement of the rod 521 will cause the sleeve 524 to vary the degree of effective opening of the apertures 516. The sleeve 514 may be moved by the piston 523 to close the apertures 516 entirely.

For the purpose of adjusting piston 523 and the sleeve 524, high pressure fuel is fed from the main engine fuel system through pipe 525 to the end of cylinder 522 nearer to the pump rotor 513. The end of cylinder 522 remote from the pump rotor 513 is also fed with high pressure liquid from the pipe 525 but in this case through a restrictor 526. From the end of cylinder 522 remote from rotor 513 a vent pipe 527 extends to a servo vent 228 in a vent unit 229 (seen in FIGURE 9 and described later). The escape flow of fuel permitted from the vent 228 will determine the pressure drop occurring through the restrictor 526 and will thus determine the pressure in the end of cylinder 522 opposite to the rotor 513. Full fuel pressure acts at the other end of the cylinder 522 but over a smaller area of the piston 523. Adjustment of the vent 228 will, therefore determine, the position of the piston 523 in the cylinder 522 and will thus determine the permitted opening of the apertures 516. The speed of rotation of the pump rotor 513 and its size are so determined that throughout the range of controlled flow rates of fuel, the fuel within the casing 512 will form an annulus within the pump casing whose radial depth will determine the pressure given to the delivered liquid. The centre of this annulus is completely isolated from the atmosphere, with the result that pressure within the annulus is the vapour pressure of the liquid. Fuel is supplied at the boost pressure of the aircraft to the inlet 518. This is a comparatively low pressure sufficient to supply the various pumps on the aircraft using fuel. The pressure drop of fuel passing the apertures 516 will, therefore, be effectively the boost pressure, since vapour pressure is normally quite small with the result that fuel flow into the pump will be determined by the permitted opening of the apertures 516. The radial depth of fuel within the pump casing 512 will adjust itself automatically in accordance with the flow rate of liquid entering the rotor 513 to ensure that such flow rate is sufficiently pressurized to flow through the delivery 215.

For shutting off the entry flow of fuel into the pump 511 a shut-off valve unit 531 (FIG. 3) is provided. The passage 518 extends from a chamber 532 in the unit 531 and fuel enters the passage 532 from an inlet connection 533. Within the chamber 532 a shut off valve member 534 is adapted to seat upon a seat 535 to shut off flow from the connection 533 into the passage 518. Adjacent to the chamber 532 a servo cylinder 536 is located which contains a servo piston 537. From the piston a piston rod 538 extends in a sealed manner through one end of the cylinder 536 into the chamber 532 and within the chamber 532 the valve member 534 is mounted on the piston rod 538. In the cylinder 536 a spring is provided which acts to urge the piston in a direction causing the valve 534 to close onto its seat 535. The end of the cylinder 536 containing the spring 539 is connected by pipe 541 to the passage 533 which is at the low boost pressure of the aircraft. Fuel at pressure from the pipe 525 is fed through restrictor 542 into the end of cylinder 536 adjacent to the chamber 532. The pipe 376 extends from this end of the cylinder 536 for connection to the vent 117 (FIG. 6).

The fuel in the delivery passage 215 (FIGS. 3 and 9) passes through a flow control 216 (FIG. 9) before entering a passage 217 which leads to the first gallery in the engine. The control 216 comprises a cylinder 218 (FIG. 9) within which a sleeve 219 is slidable. The passage 215 terminates in a port 221 in the wall of the cylinder 218. Fuel leaves through a port 222 in the wall of the cylinder 218 which leads to the passage 217. The sleeve 219 includes a plurality of ports 223 in its wall which overlap the port 222 and determine an effective throttle aperture for fuel entering the passage 217. The sleeve 219 is adjusted in the axial direction by means of a servo piston 224 slidably mounted in a servo cylinder 225. A piston rod 226 connects piston 224 to the sleeve 219, such piston rod extending in sealed manner through one end of the cylinder 225. Another piston rod 227 extends in sealed manner through the opposite end of the cylinder 225 and carries a spring end cap 240 against which a compression spring 230 acts in compression. The spring 230 and end cap 240 are located in a chamber 231 formed within the structure which includes the cylinder 218. Within the chamber 231 a lever 232 is secured at pivot 233 for pivotal movement. The compression spring 230 acts on one end of the lever 232. At the opposite end of the lever 232 a pair of bellows 234 and 235 are fixed to opposite walls of the chamber 231, the free ends of these bellows being driven by a rod 236 having a pivot pin connection 237 to the lever 232. The bellows 234 is evacuated whilst the bellows 235 is connected to the pipe 238 to receive a control pressure proportional to delivery pressure from the engine compressor. The servo piston 224 is energised by fuel at pressure from the main engine fuel system fed through pipe 525. Fuel at pressure is fed to the two ends of the cylinder 225 through a pair of restrictors 239 and 241. A pair of passages 242 and 243 extend from the two ends of the cylinder 225 to a pair of vents 244 and 245 disposed one on either side of the lever 232. The position of the lever 232 between the vents 244 and 245 determines the relative escape flows from these vents and thereby determines the relative values of the reduced pressures in the two ends of the cylinder 225. The arrangement is such that an equilibrium position for the servo piston 224 is attained when the load given by movement of the piston 224 through the spring 230 onto the lever 232 balances the load imposed on the bellows 235 by pressure fed through the pipe 238. The arrangement is such that with increase in pressure fed through the pipe 238 the ports 223 more and more coincide with the port 222, permitting increased flow of fuel through passage 217 into the first gallery.

In order to accurately determine flow through the flow control 216 means are provided to control the pressure drop at the overlapping ports 222 and 223 to a fixed constant value. For this purpose the vent unit 229 (FIG. 9) is provided. The vent unit 229 comprises a body enclosing a pair of separated chambers 246 and 247. A pivoted lever 248 extends through a sealed hole 249 in the wall between the two chambers 246 and 247, this hole being suitably sealed against flow of liquid by means of a metallic diaphragm. The pivot 251 is located in the hole. Within the chamber 248 a bellows 252 is provided within which is located a compression spring 253 which applies a predetermined loading to the lever 248 through a pivot pin 254. The interior of the bellows 252 is connected by pipe 255 to the port 222 to receive pressure downstream of the throttle position. The chamber 246 is connected by pipe 256 to the fuel pressure delivery pipe 215. There is thus supplied across the bellows 252 the pressure drop occurring at the overlapping ports 222 and 223. Within the chamber 247 the vent 228 is located which is controlled by a half-ball valve 257 which is carried by the lever 248. The operation is that with increase in pressure drop at the overlapping ports 222 and 223, the bellows 252 will tend to collapse to move lever 248 to seat the half-ball 257 on the vent 228. Thus increase in flow will reduce the leakage through the vent 228 from the end of cylinder 222 remote from the pump rotor 513 to raise pressure and to cause piston 523 to move the sleeve 524 in the sense to reduce the effective opening of the apertures 516.

Figure 4:
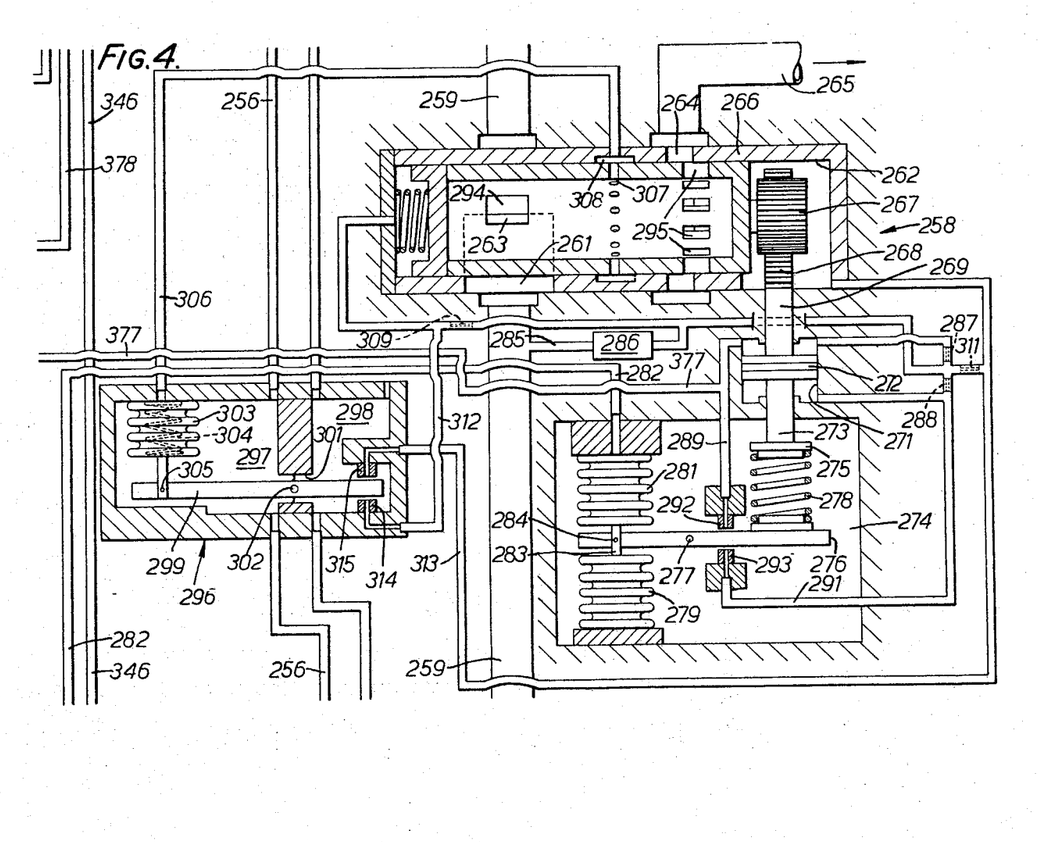
FIGURE 4 is a detailed illustration including the flow control for the second gallery of the engine in the system of FIGURE 10.

The fuel flow to the second gallery is controlled by a flow control 258 (FIG. 4). A branch pipe 259 from the delivery pipe 215 enters the port 261 in the wall of a cylinder 262. This port is comparatively long in its axial extent and includes one bounding straight edge 263 which is parallel to the axis of the cylinder 262. A port 264 in the wall of cylinder 262 connects to a passage 265 which carries fuel from the valve 258 to the second burner gallery. Within the cylinder 262 a sleeve 266 is provided having closed ends. At the right hand end of the cylinder 262 as seen in the drawing the sleeve 266 is provided with a pinion 267 in mesh with a rack 268. The rack joins a piston rod 269 which extends in sealed relation through the wall of the cylinder 262 into a servo cylinder 271 extending transversely to the cylinder 262. Within cylinder 271 the connecting rod 269 is secured to a piston 272. From the opposite side of the piston 272 a connecting rod 273 extends into a chamber 274 forming part of the structure which mounts cylinder 262. Within chamber 274 the rod 273 terminates in the spring end cap 275. Also within the chamber 274 is a lever 276 pivoted at a fulcrum 277. A compression spring 278 acts between the lever 276 and the rod 273. Fixed in the chamber 274 at opposite walls thereof are a pair of bellows 279 and 281. The bellows 279 is evacuated and the bellows 281 is connected to a pipe 282 to receive a control pressure which is a fraction of compressor delivery pressure. The bellows 279 and 281 are joined by a rod 283 which is connected by a pivot pin 284 with the lever 276.

For servo operation of the piston 272 (FIG. 4) fuel delivered by the pump 211 is supplied through the pipe 285 and filter 276 to a pair of restrictors 287 and 288. From these restrictors the fuel enters the two ends of the cylinder 271. From the two ends of the cylinder 271 a pair of pipes 289 and 291 extend to a pair of vents 292 and 293 disposed one on either side of the lever 276. The arrangement is such that the relative leakages permitted from the vents 292 and 293 by the position of the lever 276 determine the relative pressures in the two ends of the cylinder 271, any pressure difference causing movement of the piston 287 and consequent rotation of the sleeve 266. Movement of the piston 272 is fed back through spring 278 on to lever 276 and the arrangement is such that rotation given to the sleeve 266 is in proportion to the pressure supplied to the bellows 281.

Rotation of the cylinder 266 (FIG. 4) will determine the overlap of a port 294 in the sleeve 266 and the port 261, such overlap occurring at the straight edge 263. In this way axial movement of the sleeve 266 will not alter the overlap of port 294. The rotary movement of the sleeve 266 determines an effective opening of of the port 294 in accordance with control pressure from the pipe 282 and it is arranged that axial movement of the sleeve 266 will cause a variable overlap between ports 295 in the sleeve and port 264 in the cylinder, the endwise movement being adjusted to ensure that a predetermined pressure drop occurs at the port 294. For this purpose a vent unit 296 is provided which comprises a structure including two chambers 297 and 298. A lever 299 extends through a hole 301 in the wall between the chambers and is pivoted at pivot 302 located transversely across the hole 301. A metal diaphragm located between the lever and the hole 301 prevents flow of fluid between the two chambers. The chamber 297 contains a bellows 303 containing a compression spring 304. The bellows 303 is fixed to the wall of the chamber 297 and at its free end is connected by a pivot pin 305 to the lever 299. The chamber 297 is fed with delivery pressure of fuel from the pump 511 through pipe 256 whilst the interior of the bellows 303 is fed through pipe 306 with the pressure in the interior of the sleeve 266. Such pressure is obtained by cooperating ports 307 and 308 in the sleeve 266 and cylinder 262 respectively. From the pipe 285 downstream of the filter 286 a pair of restrictors 309 and 311 carry fuel respectively to the left and right hand ends of the cylinder 262 as seen in the drawing. Pipes 312 and 313 carry liquid respectively from the left and right hand ends of the cylinder 262 to a pair of vents 314 and 315 respectively, these vents being located on opposite sides of the lever 299 within chamber 298. The arrangement is such that relative leakages from the vents 314 and 315 will determine relative pressures in the ends of the cylinders 262, such pressures causing axial movement of the sleeve 266 and variation of the overlap of ports 295 and 264 until the throttling of fuel flow into the port 264 is sufficient that the pressure drop occurring at the overlapping areas of ports 294 and 261 is at a value determined by the loading of the spring 304 within bellows 303. In this way irrespective of the pressure in the pipe 259 from the delivery of the pump 511 any desired flow rate of fuel into the second gallery may be obtained in accordance with the pressure fed through the pipe 282 into the bellows 281.

Figure 2:
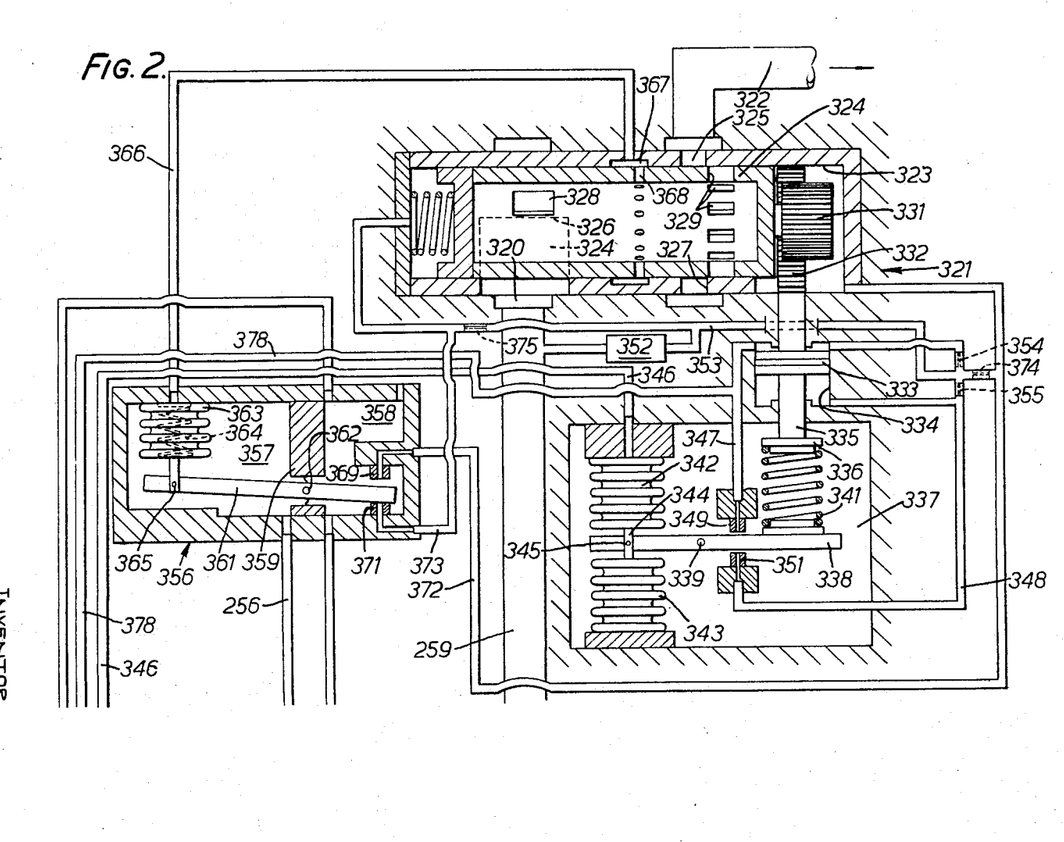
FIGURE 2 is a detailed illustration of a portion of the system of FIGURE 10 including the flow metering control.

Reference is now made to the flow metering control 321 (FIG. 2) which controls fuel flow from the pipe 259 into the pipe 322 extending to the third reheat burner gallery 5. The structure of the flow metering control 321 is identical with the structure of the flow metering control 258 although as shown (FIG. 2) it assumes a different condition because the flow control to the third gallery in the drawing is cut off. The control 321 includes a cylinder 323 within which is located a sleeve 324 having closed ends. Into the wall of the cylinder 323 open a pair of ports 320 and 325. The port 320 is connected with the supply pipe 259 and it includes a straight edge 326 which extends parallel to the axis of the cylinder 323. The port 325 is a peripheral port having one edge 327 which extends in a plane perpendicular to the axis of cylinder 323. In the sleeve 324 is located a small port 328 which cooperates with the port 320. As shown (FIG. 2) the port 328 is in the cutoff position and it just fails to overlap the edge 326 of port 320. Also within the sleeve 324 are ports 329 which cooperate with the port 325, the area of overlap over the edge 327 forming an adjustable throttle for controlling fuel flow. The sleeve 324 is rotatable by means of a pinion 331 engaged by a rack 332. The rack 332 is the piston rod extending from a piston 333 slidably mounted in a servo cylinder 334 extending from the side of cylinder 323. The piston rod 332 extends in a sealed manner through one end of the cylinder 334 and from the opposite end of the piston 333 a further rod 335 extends in a sealed manner through the opposite end of the cylinder 334 to terminate in a spring end cap 336. The spring end cap 336 is located in a chamber 337. Within the chamber 337 is located a pivoted lever 338 pivoted at a fixed fulcrum 339. A spring 341 acts between the end cap 336 and one end of the lever 338. In the chamber a pair of bellows 342 and 343 are located on opposite walls thereof, the free ends of these bellows being joined by a rod 344 having a pivotal connection 345 with the end of the lever 338 opposite to the spring 341. The bellows 343 is evacuated whilst the bellows 342 is connected to a pipe 346 which receives a controlling pressure. The two bellows 342 and 343 are of equal diameter. From the two ends of the cylinder 334 a pair of vent passages 347 and 348 extend to a pair of vents 349 and 351 disposed one on either side of the lever 38. The servo liquid for supply to the cylinder 334 is obtained through filter 352 from the pipe 259, the filter leading into a pipe 353. The pipe 353 is connected to the two ends of the cylinder 334 through a pair of restrictors 354 and 355. In normal operation, other than in the shutoff condition the position of the lever 338 between the vents 349 and 351 determines the relative leakage flows from the vents and therefore the relative flow rates through the restrictors 354 and 355. This in turn determines the relative pressures at the two ends of the cylinder 354 which will cause movement of the piston 333. A position of balance is obtained when the feedback loading from piston 333 applied through spring 341 on to lever 338 is balanced by the loading imparted by the bellows 342 and 343 on to the lever 338. The position taken up by the piston 333 is therefore in direct proportion to the pressure exerted in bellows 342 from pipe 346. The position of the piston 333 will by virtue of the rack and pinion 331 and 332 determine the overlap of the port 328 with the port 320. As shown of course the port 328 does not overlap port 320. In order to determine the overlap of the port 329 with the port 325, a vent unit 356 (FIG. 2) is provided which is similar in construction to the unit 296. It comprises a pair of chambers 357 and 358 separated by a wall having a hole 359. A lever 361 extends through the hole 359 and is pivotally secured at a pivot pin 362 which extends transversely through the hole 359. A metal diaphragm seals across the hole 359 to prevent leakage between chambers 357 and 358. In the chamber 357 a bellows 363 is provided which is internally loaded by a spring 364. The bellows is secured at one end to the wall of the chamber 357 and at its opposite end acts through a pin 365 on to the lever 361. The bellows is connected by pipe 366 with a port 367 in the wall of cylinder 323. This port co-operates with ports 368 within the sleeve 324 so that pipe 366 is always connected to receive pressure from the interior of sleeve 324. The chamber 357 is connected to pipe 256 to receive pressure from the delivery pipe 215 from the pump 511. Thus the bellows 363 responds to the pressure drop occurring at the throttle formed by the overlap of the ports 320 and 328. In chamber 358 a pair of servo vents 369 and 371 are provided one on either side of the end of the lever 361. The vent 369 is connected to a pipe 372 which extends to the right hand end of cylinder 323 as seen in the drawing (FIG. 2). The vent 371 is connected to a pipe 373 which extends to the left hand end of the cylinder 323 as seen in the drawing. Pipe 372 is fed with liquid at pressure from pipe 353 through a restrictor 374 whilst the pipe 373 is fed with liquid at pressure from pipe 353 through a restrictor 375.

The position of the lever 361 (FIG. 2) between the vents 369 and 371 determines the relative flow rates from the two vents and thus the flows through the two restrictors 374 and 375. This in turn determines the relative pressures acting at the two ends of the cylinder 323 and will urge the sleeve axially to adjust the overlap of the ports 329 with the port 325 to the extent that the pressure drop occurring at the overlap of ports 320 and 328 is maintained at a constant value determined by the loading of spring 364. By maintaining the pressure drop at these ports constant, the flow rate through the pipe 322 to the third gallery will be controlled to a desired value.

Figure 3:
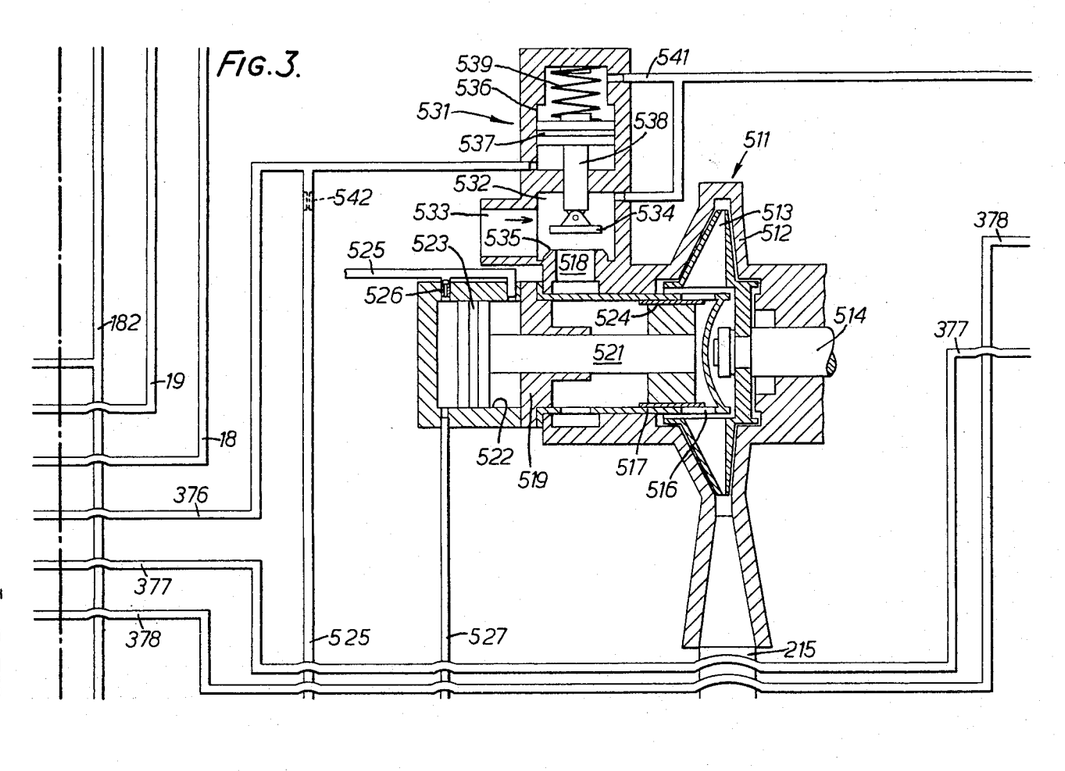
FIGURE 3 is a detailed illustration of a portion of the system of FIGURE 10 including the centrifugal pump assembly.

The actual shutting on or shutting off of fuel flow to the three galleries 3, 4 and 5 (FIG. 1) is determined by the closing or the opening of the three servo vents 115, 116 and 117 (FIG. 6). The vent 117 which controls the first gallery is connected to a pipe 376 which extends from cylinder 536 in shut off unit 531 (FIG. 3). When vent 117 is closed piston 537 will move upwardly as seen in the drawing (FIG. 3) because of the rise in pressure beneath it, and such movement will lift valve member 534 from its seat permitting entry of fuel at boost pressure into the pump 511. From the pump 511 fuel will then be pumped through passage 215 to the flow control 216 (FIG. 9) which will control fuel delivered to passage 217 by acting on piston 523 of the pump 511. Similarly the servo vent 116 for the second gallery is connected through pipe 377 to the upper end as seen in the drawing (FIG. 4) of servo cylinder 271 of the control 258. When the servo vent 116 is closed servo piston 272 will position itself as described in accordance with the pressure exising in pipe 282. When vent 116 is open the pressure above piston 272 as seen in the drawing (FIG. 4) will be reduced to a very low value to rotate the sleeve 266 to a position where port 294 does not overlap port 261 thereby shutting off flow to the second gallery. Vent 115 for the third gallery is connected to pipe 378 which extends to the upper end of the servo cylinder 334 (FIG. 2) to a control 321. When the vent 115 is closed servo piston 333 will position itself in accordance with pressure supplied from the pipe 346. When the vent 115 is open the pressure of the servo piston 333 wil reduce to a very low value causing the sleeve 324 to rotate to the position indicated where the port 328 does not overlap the port 320. In this way fuel flow is cut off from the pipe 322 leading to the third gallery.

For supplying control pressures to the pipes 238, 282, and 346 a cam unit 381 (FIG. 8) is provided. In this unit three three-dimensional cams 382, 383 and 384 are mounted for rotation on a common shaft 385 carried in bearings 386. For convenience in description each three dimensional cam will be called a "camoid." The shaft 385 carries a gear wheel 387 in mesh with a long pinion 338 so that longitudinal movement of the shaft 385 may occur without wheel 388 and pinion 389 coming out of mesh. The pinion 338 receives rotational drive by a convenient feedback link 389 from the feedback lever 21. At the end of the shaft 385 opposite to the gear 387 a floating lever 391 is provided to act axially against the end of the shaft 385. The end of lever 391 opposite to that engaged by the shaft 385 is pivotally connected at pivot 392 to a plunger 393 suitably mounted in a bearing 394. The plunger 393 receives endwise movement from the link 203 actuated by the servo piston 201. The fulcrum of the lever 391 is formed by a cam 395 which bears against the lever 391. The cam 395 is rotatably mounted on a pivot 396 and is adjustably rotated by means responsive to compressor inlet temperature of the gas turbine engine. Rotation of the cam 395 effectively adjusts the fulcrum position in a direction transverse to the length of the lever 391.

Figure 8:
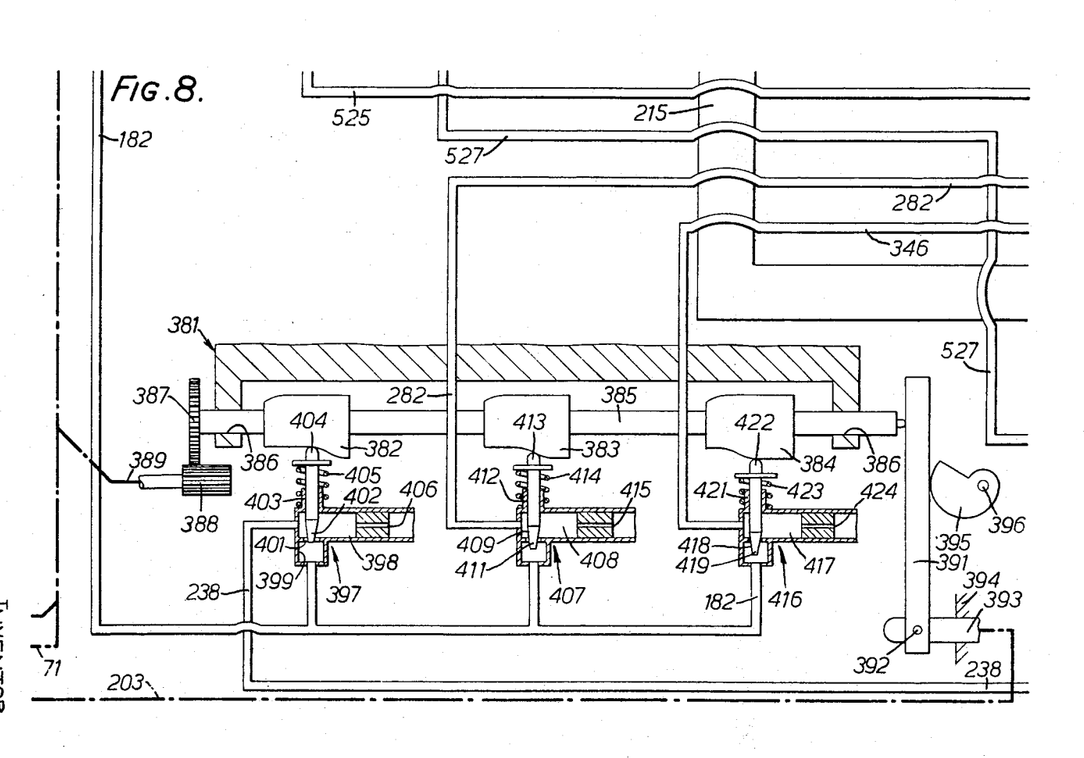
FIGURE 8 is a detailed illustration of the cam unit for supplying control pressures to various parts of the system.

Cooperating with the camoid 382 is a restrictor unit 397. Within this unit is a chamber 398 fed through the passage 399 with delivery pressure from the compressor of the gas turbine engine through pipe 182. An orifice 401 controls entry of air in the chamber 398 and in the orifice a tapered pin 402 is slidably mounted. The tapered pin 402 is carried by a bearing 403 extending from the wall of the chamber 398 and at its outer end is provided with a nose which engages the surface of camoid 382. A spring 405 urges the tapered pin 402 outwardly so that the nose 404 remains constantly in contact with the camoid 382. Air leaves the chamber 398 through a restrictor 406 to a low pressure zone such as the engine nacelle. The restrictor 406 is designed so that under all its operating conditions it is choked. This means that the nondimensional flow rate through the restrictor 406 is substantially constant irrespective of the applied pressure and therefore that for any one position of the tapered pin 402 the pressure within the chamber 398 is directly proportional to compressor delivery pressure supplied through pipe 182. This proportionality will vary with alteration of the position of the tapered pin 402 following rotation of the cam 382. The pipe 238 is connected to the chamber 398 so that the pressure in chamber 398 forms a control pressure on bellows 234 of the flow control 216 for the first gallery.

A restrictor unit 407 (FIG. 8) cooperates with the cam 383 and the structure is similar to the unit 397. In particular it contains a chamber 408 fed through orifice 409 from pipe 182. Within the orifice 409 tapered pin 411 is slidably mounted in bearings 412 forming part of the wall of the chamber 408. Externally of the chamber taper pin 411 has a nose 413 urged by spring 414 into engagement with the camoid 383. A restrictor 415 arranged always to operate in the choked condition, carries air from the chamber 408 to a low pressure zone. As described with reference to unit 397 the pressure in the chamber 408 for any one position of the taper pin 411 is proportional to the compressor delivery pressure supplied through pipe 182, the proportionality varying with the axial position of the taper pin 411. The chamber 408 is connected to pipe 282 so that pressure in chamber 408 forms the control pressure acting in bellows 281 for the control 258 to determine flow rate to the second gallery.

A restrictor unit 416 cooperates with the camoid 384. This unit is similar to the units 397 and 407. It comprises a chamber 417 fed with compressor delivery pressure from pipe 182 through an orifice 418. Within the orifice 418 a tapered pin 419 is axially slidable, being supported by a bearing 421. The tapered pin 419 has a nose 422 engaging the camoid 384, the whole pin being spring urged by spring 423 so that nose 422 constantly engages camoid 384. Restrictor 424 carries air from the chamber 417 to a low pressure zone and is arranged to operate constantly in a choked condition. For any one position of the tapered pin 419 the pressure in chamber 417 is proportional to compressor delivery pressure. Variation in axial position of the tapered pin 419 will vary the proportionality. Pressure from the chamber 417 acts through pipe 416 in the bellows 342 of the flow control 321 and thus determines flow rate of fuel through pipe 322 to the third gallery 5.

In normal operation of the engine without reheat the pilot's reheat control 88 (FIG. 6) is maintained in the fully anticlockwise position as seen in the drawing and in this condition the plunger 77 (FIG. 6) will be raised to an upper position which through the medium of valve 42, the servo valve 25 and the rams 15 (FIG. 1) will move the adjustable vanes 6 and 7 to their innermost position. The cams 97 and 98 (FIG. 6) in this condition will be positioned so that the cam followers 95 and 96 engage the lowermost dwells 109 and 110. Also the vents 115, 116 and 117 will be uncovered, the members 118, 119 and 121 being held away from these vents by the latches 125, 126 and 127. The maintaining open of the servo vent 117 means that low pressure only can exist in pipe 376 and the lower end of the servo cylinder 536 (FIG. 3) of the shut-off unit 531. As a result the valve member 534 (FIG. 3) closes onto its seat 535 and no fuel can enter into the pump 511. Since no fuel can then leave the pump 511 through the delivery pipe 215 there will be no flow through the overlapping ports 222 and 223 of the flow control 216 (FIG. 9) and accordingly there will be no pressure drop. The bellows 252 of the vent unit 229 (FIG. 9) will therefore extend fully to open the servo vent 228. This in turn will reduce the pressure at the left hand end of servo cylinder 522 of the pump (FIG. 3) to a very low value causing a maximum opening of the apertures 516 in the centre of the pump impeller 513.

Figure 7:
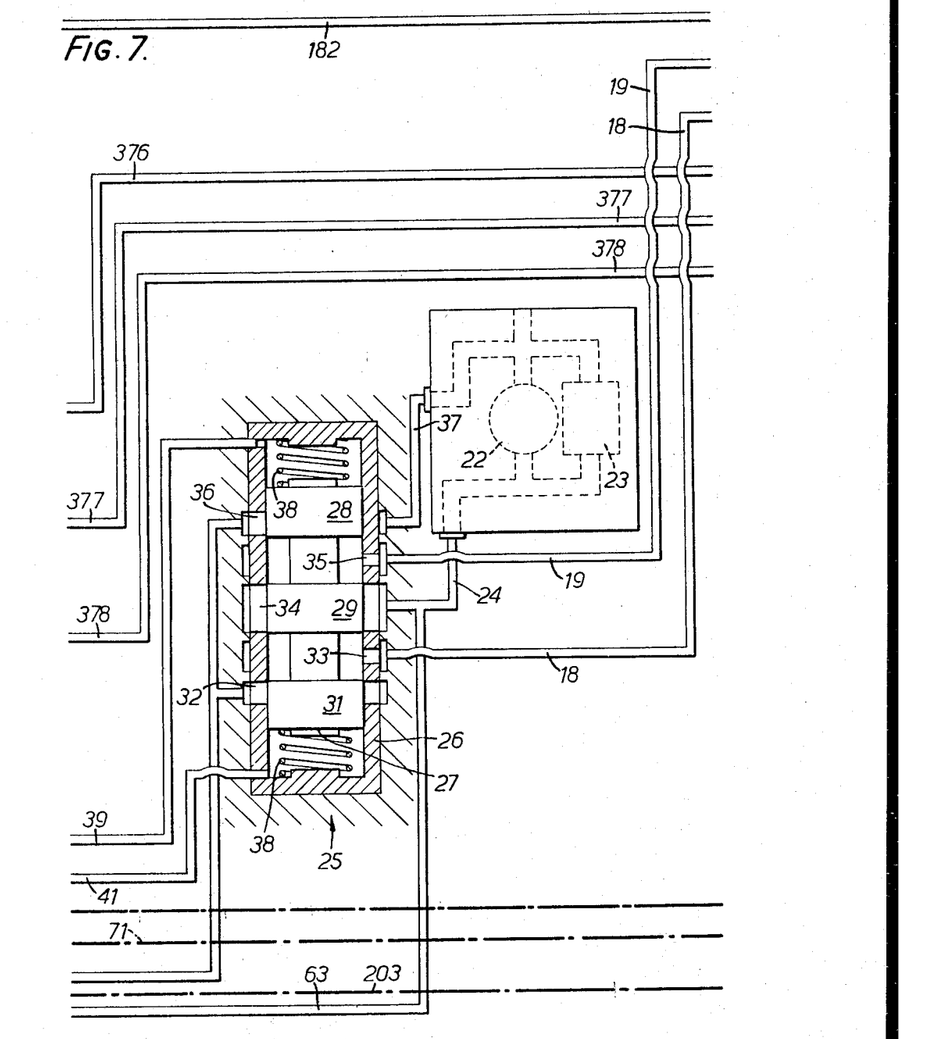
FIGURE 7 is a detailed showing of the hydraulic pump and associated valve assembly for the system.
Figure 9:
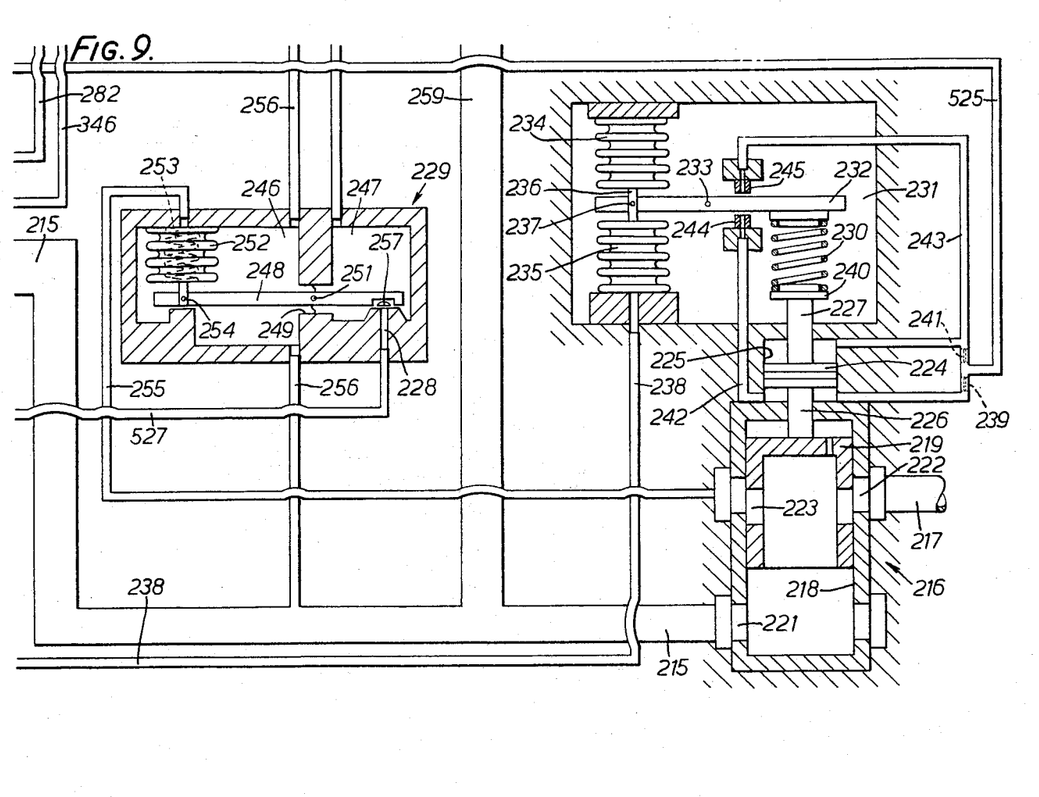
FIGURE 9 is an illustration of a portion of the system of FIGURE 10 and including details of a flow control unit.
Figure 10:
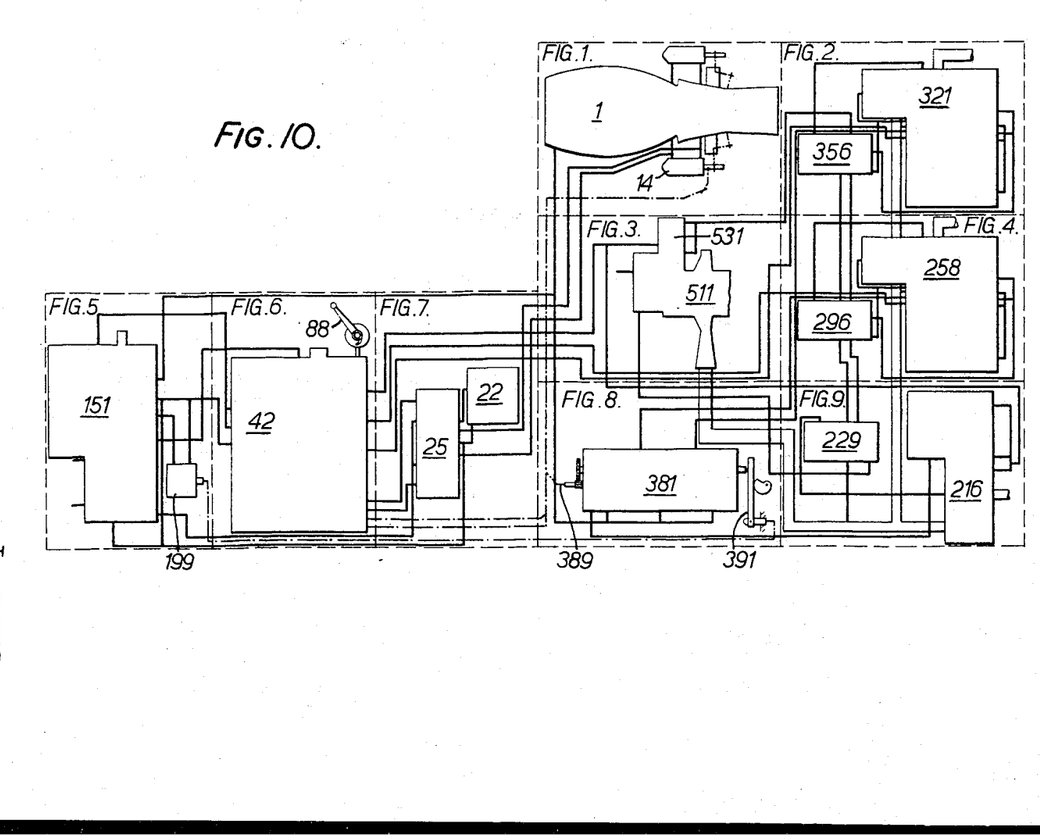
FIGURE 10 is a block diagram of the entire system including an indication of the way in which the various individual sheets of drawings can be assembled to provide a complete detailed system drawing.

The fact that the vents 115 and 116 for the second and third galleries are also open will cause the sleeves 266 and 324 of the flow controls 258 and 321 (FIGS. 4 and 2, respectively) to move their respective ports 294 and 328 to the closed position thereby ensuring that there is no flow to the second and third galleries. The fuel system of the main engine is provided with interlocking means which ensure that the reheat operation cannot be selected by the pilot until the engine is running at its maximum maintainable speed. When the engine is raised to its maximum maintainable speed the piston 168 (FIG. 5) which responds to turbine pressure ratio will rise to respond to the increase in pressure ratio as engine speed increases and at the maximum maintainable speed the vent 193 carried by piston rod 171 will clear the periphery 196 of cam 194. This will reduce pressure in the right hand side of the piston 139 as seen in the drawing (FIG. 6) and will allow the pawl 148 to engage on the plunger 77. In the non reheat position and when the pawl becomes released it will engage in the recess 145 to latch plunger 77 against movement. The selection of a small degree of reheat by the pilot by moving the lever 88 in a clockwise direction will result in raising the right hand end of lever 82 about the pivot 81 as a fulcrum. The spring-loaded plunger 91 will give way and the plunger 93 will be raised by the spring loading in the compression spring 90. Initial raising of the plunger 93 will cause the transverse plunger 134 to engage the nose 131 of member 121 causing it to pivot in a clockwise direction as seen in the drawing against the action of the latch 127 to close the vent 117. After the member 121 seats on the vent 117 engagement of plunger 134 with the nose 131 will prevent further movement of the plunger 93 under the action of spring 90. Closure of the vent 117 will cut off leakage from the pipe 376 and pressure will build up in this pipe and in the lower end of the cylinder 536 of the shut off valve unit 531 (FIG 3). This increase in pressure will raise the servo piston 537 to lift valve member 534 from its seat 535 permitting fuel at boost pressure from the connection 533 to enter passage 518 into the pump 511. Since initially the apertures 516 are fully opened there will be a substantial flow rate through the delivery pipe 215. Immediately this flow rate passes through the overlapping apertures 222 and 223 (FIG. 9) of the flow control 216 a pressure drop will occur which is fed to the bellows 252 of vent unit 229. The half ball valve 257 will immediately move to a control position having regard to the vent 228 to cause adjustment of the servo piston 523 in the pump 511 (FIG. 3) so that delivery from the pump 511 is reduced to the value at which the predetermined pressure drop occurs at the overlapping ports 222 and 223 of the flow control 216. In this condition the rate of fuel flow is at a minimum and is controlled principally by the setting of the taper pin 402 in the restrictor unit 397 (FIG. 8) which determines the control pressure existing in the bellows 235 of flow control 216 (FIG. 9). This pressure is at a minimum because it is controlled through the feedback lever 21, link 389 (FIG. 4), pinion 388 (FIG. 8), gear 387 and camoid 382. Such fuel flow is then sprayed into the jet nozzle from the first gallery. Ignition of such reheat fuel takes place in any conventional manner. On ignition of the fuel there is a substantial pressure rise in the jet nozzle which reacts on the turbine pressure ratio piston 168 (FIG. 5) to cause it to indicate a reduction of turbine pressure ratio. Effectively the action is that pressure will rise in the bellows 163 disturbing the balance of lever 156 to lower the pressure under piston 168 so that it will move downwardly as seen in the drawing (FIG. 5) so that the vent 193 becomes covered by the periphery 196 of cam 194. This will raise the pressure on the right hand side of piston 139 as seen in the drawing (FIG. 6) since leakage through the associated restrictor 190 is reduced to a low value. In turn the piston 139 will move to the left as seen in the drawing and will simultaneously disengage pawl 148 from recess 145 and pull the bar 137 to engage the transverse plunger 134 to move it out of engagement with nose 131 of lever 121. As a result the plunger 93 will move upwardly under the load of spring 90 until the fulcrum 89 is pushed against the plunger 91. The load of the spring-loaded plunger 91 against fulcrum 89 will also simultaneously cause the left hand end of lever 82 to move downwardly carrying plunger 77. Such movement will be transmitted to the spool valve 45 of the control lever 42 and liquid pressure from the pipe 63 will then be able to flow through port 57 in between lands 47 and 48 into the pipe 39 to the upper end of cylinder 26 of servo valve 25 (FIG. 7). Similarly the lower end of the servo cylinder 26 is connected through port 56 (FIG. 6) into a space between lands 47 and 46 and through port 55 into the return flow circuit 40. The spool valve 27 will then move downwardly and pressure from the pipe 24 will be connected through the space between lands 28 and 29 to the pipe 19 causing movement to the left as seen in the drawing of the pistons 15 and opening movement of the nozzle vanes 6 and 7. Movement of the nozzle vanes will of course move the feedback lever 21 which through link 71, lever 72, link 73 and cam 68 will react on the servo piston 61 (FIG. 6) to move the latter downwardly and effectively to cancel the displacement relatively between the piston valve 45 and the sleeve 44 when movement of the vane 6 and 7 is in proportion to the selected movement of the pilot's lever 88. Opening of the nozzle vanes will reduce the impedance of the jet nozzle permitting the exhaust pressure of the turbine to become lower and the pressure ratio of the turbine to rise. The pressure ratio of the turbine will now be controlled to a position in which the servo vent 192 carried by the piston rod 171 (FIG. 5) will be partially obturated by the periphery 196 of cam 194. The function of the vent 192 is to control the position of servo piston 201 in its cylinder and in turn to control the adjustment given to the plunger 393 (FIG. 8) which adjusts the shaft 385 and the camoids in the endwise direction. Such adjustment will cause adjustment of the position of the tapered pin 402 in its orifice 401 and thereby it will adjust the control pressure fed to the bellows 235 (FIG. 9) which in turn will adjust the overlap of the ports 222 and 223 and thus alter the throttling effect on fuel fed to the first gallery. The whole arrangement is such that a position of equilibrium will be obtained whereby the fuel flow to the first gallery will be adjusted to maintain the vent 192 partially obturated by the periphery 196 of cam 194, i.e., the fuel flow will be adjusted to maintain a predetermined pressure ratio at the turbine. This predetermined pressure ratio is variable by virtue of variation of entry temperature into the compressor and for this purpose the electro-hydraulic servo valve 208 acting through servo piston 206 will adjust the position of the cam 194 so that turbine pressure ratio maintained is appropriate to the compressor entry temperature.

The feedback of nozzle vane movement is also applied to the shaft 99 which rotates the cams 97 and 98 (FIG. 6). The cam 97 is directly driven by the shaft 99 and the cam 98 includes a lost motion connection by virtue of the pin and slot 104, the spring acting on the cam 98 to urge it to one end of the lost motion in the anticlockwise sense as seen in the drawing. In the non-reheat position the two cam followers 95 and 96 engage the lowermost dwells 100 and 110 of the two cams. As soon as light up of the first gallery has occurred and the plunger 77 is unlatched, the nozzle vanes 6 and 7 will move and the feedback to the shaft 99 will rotate cams 97 and 98 in an anticlockwise sense, the ramp 102 between the dwells 100 and 106 engaging the cam follower 95 to tend to urge it upwardly whilst the step between the dwells 110 and 112 of cam 98 engages the side of the follower 96 and is prevented from rotation by virtue of its lost motion. For normal fuel flow control during operation with the first gallery on the dwell 106 and a part of the ramp 102 between dwells 100 and 106 will support the cam follower 95. As soon as the vanes have moved a sufficient amount to cause cam 97 to rotate so that the dwell 106 supports the follower 95 the cam 98 will rotate under its spring loading to the end of its lost motion so that the dwell 112 moves under th follower 96. For variations in the amount of extra thrust obtained during operation of the first gallery the lever 88 may be moved backwards and forwards over about the first third of its movement and within this range of movement the lever 88 exerts direct control on the position of the vanes of the nozzle. All of the servo vents which appear in the illustrated embodiment are enclosed in chambers in which the leakage is collected and returned to a low pressure zone. In the case of chambers 247 (FIG. 9), 298 (FIG. 4), 358 (FIG. 2), 231 (FIG. 9), 274 (FIG. 4) and 337 (FIG. 2) the collected leakage flow is piped back to the boost pressure inlet connection 533 of the pump 511. In the case of chambers 152 and 184 the collected leakage flow is fed by pipes to the inlet connection 37 of the oil pump 22.

For any selected position of the vanes 6 and 7 the fuel flow will be automatically adjusted to maintain the turbine pressure ratio at the predetermined value, such control being obtained by arranging that the servo vent 192 carried by the turbine pressure ratio piston 168 must always be partially obturated by the cam 194. This effect is obtained by controlling fuel flow from the vent 192 through the medium of the servo piston 201, link 203, endwise movement of the shaft 385, adjustment of the tapered pin 402 and consequent adjustment of control pressure fed to the bellows 235 in flow control 216.

After movement of the control lever to about one third of its total movement the reheat thrust obtained requires substantially maximum fuel flow for the first reheat burner gallery and it is arranged that at this position the pawl 148 will move into the recess 146 in the plunger 77 (FIG. 6) locking this plunger against further nozzle increasing movement. Further movement of the lever 88 to tend to open the nozzle will react to move lever 82 around the pivot 81 as a fulcrum causing the fulcrum 89 to rise against the loading of the spring-loaded plunger 91. The spring 90 acting on the plunger 93 urges this plunger upwardly until the transverse plunger 103 engages the nose 129 of member 119 to move it against the loading of latch 126 to close the vent 116. At this point the engagement of plunger 133 with nose 129 will prevent further movement of the plunger 93. Closure of vent 116 will prevent leakage from the vent which will cause rise of pressure in the upper end of servo cylinder 271 of flow control 258 (FIG. 4). Servo piston 287 will then immediately be under the control of the lever 276 and it will move downwardly as seen in the drawing to rotate sleeve 266 so that port 294 overlaps port 261 (FIG. 4). Flow of fuel then has access through the overlapping ports from the pipe 215 into the pipe 265 leading to the second gallery. The piston 272 will move to the position determined by the control pressure fed to bellows 281 from chamber 408 of the restrictor unit 407 and the vent unit 296 will control the endwise movement of sleeve 266 to ensure that a fixed pressure drop occurs at the overlapping ports 294 and 261.

The extra flow required for the second gallery is arranged to be well within the capabilities of the pump 511. The extra flow will reduce momentarily the flow to the first gallery giving a reduction of pressure drop at the overlapping ports 222 and 223 (FIG. 9) of the first flow control. Such momentary reduction will cause momentary opening of the vent 228 which will cause substantial movement of the sleeve 524 in the centre of the pump impeller 513 to increase the size of the apertures 516 feeding fuel into the pump. Ignition of fuel from the second gallery is by the burning fuel from the first gallery. Immediately ignition takes place the pressure will rise in the jet pipe and the turbine pressure ratio will fall. The piston 168 will then move downwardly as seen in the drawing so that vent 193 is closed by the cam 194. This will raise pressure at the right hand end of the cylinder 141 (FIG. 6) which will then simultaneously act on the pawl 148 to disengage it from the recess 146 and will also act on the bar 137 to pull the transverse plungers so that plunger 133 is released from nose 129 and plunger 93 may move upwardly under its spring load. Release of the pawl 148 enables the loading of plunger 91 to act on lever 82 to move plunger 77 downwardly and as previously explained to cause further outward movement of the nozzle vanes 6 and 7. Immediately the vanes move, feedback of the movement from the lever 21 will go through the pinion 388 (FIG. 8) to rotate the shaft 385. The relative shaping of the camoids is such that successive adjustment of fuel flow takes place. The further rotation of the pinion 88 is arranged not substantially to alter the axial position of the tapered pin 402 of the restrictor unit 397. However, it is arranged to act through the camoid 383 on the axial position of the tapered pin 411. The feedback of the movement of the vanes 6 and 7 is also applied to the shaft 99 and immediately movement occurs, cam 97 (FIG. 6) is rotated to tend to move follower 95 up the ramp 109 between the dwells 106 and 107. Effectively the movement of the vanes which results from release of the pawl 148 is sufficient so that the next dwell of the cam moves under the follower 95. During rotation of the cam 97 to bring dwell 107 under the follower 95 the step between the dwells 112 and 113 on cam 98 will engage the side of the follower 96 and the cam will not rotate by virtue of its lost motion. Immediately follower 95 moves on to the dwell 107 the spring loading will move the cam 98 so that the dwell 113 engages the follower 96. Fuel flow to the first gallery will then remain at the value selected by the camoid 382 (FIG. 8) and adjusting movement of the turbine pressure ratio piston 168 (FIG. 5) to hold the vent 192 partly obturated by cam 194 will act through servo piston 201, link 203, plunger 393 (FIG. 8) and endwise movement of shaft 385 for adjustment of the camoid 383 to adjust the fuel pressure in chamber 408 and the flow to the second gallery.

Whilst the first and second galleries are in operation and the handle 88 is moved over the second third of its movement, and control of fuel flow will be effected through the camoid 383.

For further reheat thrust the lever is moved into the last third of its movement and the action which takes place will be substantially as described for movement of the handle to the second third of its movement with the exception that the third gallery is fed with fuel by reason of the closure of the vent 115 and the control of fuel flow is transferred to the third gallery by arranging that in the new position of the camoids the adjustment is such that camoids 382 and 383 (FIG. 8) retain their associated tapered pins at a constant maximum setting adjustment, adjustment being effected by camoid 384 on the tapered pin 419 to adjust the control pressure in chamber 417 and bellows 342.

In increasing reheat fuel flow by movement of the lever 88 the increase in the thrust obtained is substantially continuous with the exception of small interruptions which resullt from the latching effect of the pawl 148 required during ignition of the successive galleries. During reduction of reheat flow the pawl 148 (FIG. 6) is ineffective to latch the plunger 77 by virtue of the inclined surfaces of the pawl and of the recesses 145, 156 and 147 and downward movement of the lever 88 will successively reduce flow from the galleries to zero. If the pilot in adjusting the reheat fuel flow attempts to oscillate lever 88 at a position corresponding to initiating and cutting off fuel flow to a gallery, the cams 97 and 98 give some hysteresis to the control in the following manner. Assume that the control is in the position illustrated (FIG. 6) in which fuel is flowing to the first and second galleries but not to the third gallery and the pilot moves his lever 88 to reduce fuel flow. Since movement of the lever basically controls the vanes 6 and 7 movement of the lever will cause clockwise rotation of the two cams 97 and 98 till the position is reached where the dwell 107 moves away from the follower 95, the follower being located over the ramp 109. At this position the follower 96 will still remain on the dwell 113 near to the step between the two adjacent dwells. The plunger 93 will not be permitted to decend to cause member 119 to open its vent 116 until nozzle reduction is such that cam follower 96 reaches the step between dwells 113 and 112 at which point there is a sudden movement of plunger 93 and a sudden opening of the vent 116 by member 119. If immediately at this point the pilot decides to increase reheat fuel flow the operation will be as described for initiation of the second gallery. The result is that during downward movement of the lever 88 the position at which fuel flow is cut off from a gallery is different from the position at which fuel flow begins to flow into a gallery during increase of reheat thrust. In this way small oscillatory movements of the lever 88 by the pilot will not tend to cause continued initiation and shutting off of fuel flow to a gallery.

It will be seen that in the described embodiment of the invention movement of the lever 88 basically controls the opening of the jet nozzle and that movement of the jet nozzle itself roughly adjusts the fuel flow to the reheat galleries being fed with fuel by the action of the camoids. Trimming action of the fuel flow takes place by the operation of the turbine pressure ratio piston 168 (FIG. 5) which by virtue of the vent 192 and the obturating cam 194 will act to adjust fuel flow to maintain turbine pressure ratio at a value which depends on the compressor inlet temperature.

In the described embodiment it has been arranged that a selection of reheat fuel flow can take place only when the engine is running at its maximum maintainable speed. It is within the scope of this invention to arrange that reheat fuel flow may be brought into operation at any operational speed of the engine, trimming means then being applied to operate on the turbine pressure ratio responsive device such that the selected pressure ratio which it maintains by adjustment of reheat fuel flow depends both on engine speed and on compressor inlet temperature.

I claim as my invention:

1. A control system for an aircraft gas turbine engine having reheat burners and an adjustable area jet nozzle comprising latch means capable of locking the jet nozzle against enlargement, means responsive to nozzle area to control reheat fuel flow to the burners to maintain flow small prior to lightup, and means responsive to lightup of the reheat burners to unlatch the adjustable jet nozzle to permit jet nozzle enlargement.

2. A control system as claimed in claim 1, wherein the means responsive to the lightup of reheat burners comprises pressure sensitive means responsive to change in the ratio of pressure at the inlet and exhaust of the turbine of the gas turbine engine.

3. A control system as claimed in claim 2, including servo motor means for nozzle adjustment, said latch means being operative on the servo motor control to lock the nozzle against enlargement.

4. A control system for a gas turbine engine having an adjustable area jet nozzle and reheat burners in the jet nozzle comprising a manual control element for reheat thrust, means connecting said element with said nozzle to vary nozzle area directly, reheat fuel flow control means arranged to adjust fuel flow to the reheat burners to tend to keep engine turbine pressure ratio at a predetermined value, latch means for locking the jet nozzle against enlargement, lost motion means coupled with said element to initiate reheat fuel flow by movement of the control element to tend to enlarge nozzle area against the action of latch means, and latch removal means responsive to lightup of the reheat burners to release said latch means.

5. A control system as claimed in claim 4 wherein said latch means latches said nozzle at different areas as it becomes necessary to light up successive sets of reheat burners.

6. A control system for a gas turbine engine as claimed in claim 5 including adjustment means for rough adjustment of reheat fuel flow in accordance with the nozzle area, said reheat fuel flow control means arranged to tend to keep turbine pressure ratio at a predetermined value being coupled with said adjustment means and adapted to trim the rough adjustment given to the reheat fuel flow by a nozzle area adjustment.

7. A control system for a gas turbine engine as claimed in claim 4, wherein the lost motion means to initiate reheat fuel flow by movement of the control element to adjust nozzle area against the action of the latch includes feedback means operable by adjustment of the jet nozzle after the lightup to maintain the reheat fuel flow.

8. A control system as claimed in claim 7 wherein the feedback means includes hysteresis means to ensure that cutting off of reheat fuel flow during reduction of reheat thrust occurs at a different position of the manual control element to the position at which reheat fuel flow is initiated during increase of reheat thrust.

References Cited by the Examiner

UNITED STATES PATENTS

| 2,936,581 | 4/1960 | Williams | 60—35.6 |
| 2,987,877 | 6/1961 | Torell | 60—35.6 |
| 2,988,883 | 6/1961 | Corbett | 60—39.28 |
| 3,060,680 | 10/1962 | Wilde et al. | 60—35.6 |

JULIUS E. WEST, *Primary Examiner.*